United States Patent

[11] 3,588,248

[72] Inventors Artice M. Freund
1109-4th Ave. E.;
Laura A. Raad, 810 W. 4th St.; Wendell J. Johnson, 1220 E. Hill Court, Williston, N. Dak. 58801
[21] Appl. No. 731,753
[22] Filed May 24, 1968
[45] Patented June 28, 1971

[54] ROTATING PHOTOGRAPHIC ENLARGING EASEL FOR MAKING MULTIPLE OR SINGLE EXPOSURES
2 Claims, 10 Drawing Figs.

[52] U.S. Cl. .................................................. 355/74, 355/54
[51] Int. Cl. .................................................. G03b 27/58
[50] Field of Search ........................................ 355/74, 40, 53, 54; 95/38

[56] References Cited
UNITED STATES PATENTS
| | | | |
|---|---|---|---|
| 2,605,675 | 8/1952 | Mourfield | 355/54 |
| 2,830,493 | 4/1958 | McCain | 355/54 |
| 2,895,377 | 7/1959 | Manning | 355/54 |

FOREIGN PATENTS
| | | | |
|---|---|---|---|
| 1,052,713 | 9/1953 | France | 355/74 |

Primary Examiner—Samuel S. Matthews
Assistant Examiner—Kenneth C. Hutchison
Attorney—John A. Mawhinney ABSTRACT: An apparatus for making multiple or single enlarged exposures of the same or different images on a single large sheet of print paper including a base adapted to be stationarily positioned relative to an enlarger, a first frame supported from the base for rectilinear shifting in one horizontal direction, a second frame supported from the first frame for rectilinear shifting in a second horizontal direction disposed at right angles to the first mentioned direction and a generally horizontal print paper table supported from the second frame for horizontal rectilinear shifting therewith and rotatable relative to the second frame about a vertical axis. The print paper table includes a hinged cover frame which may be swung into and out of position overlying photographic print paper disposed on the table and the cover frame includes horizontally shiftable and overlapable masking panels operative to mask, in a light tight manner, and unmask preselected areas of the photographic print paper disposed on the table.

INVENTORS
Artice M. Freund
Laura A. Raad
Wendell J. Johnson
BY John A. Mawhinney
ATTORNEY

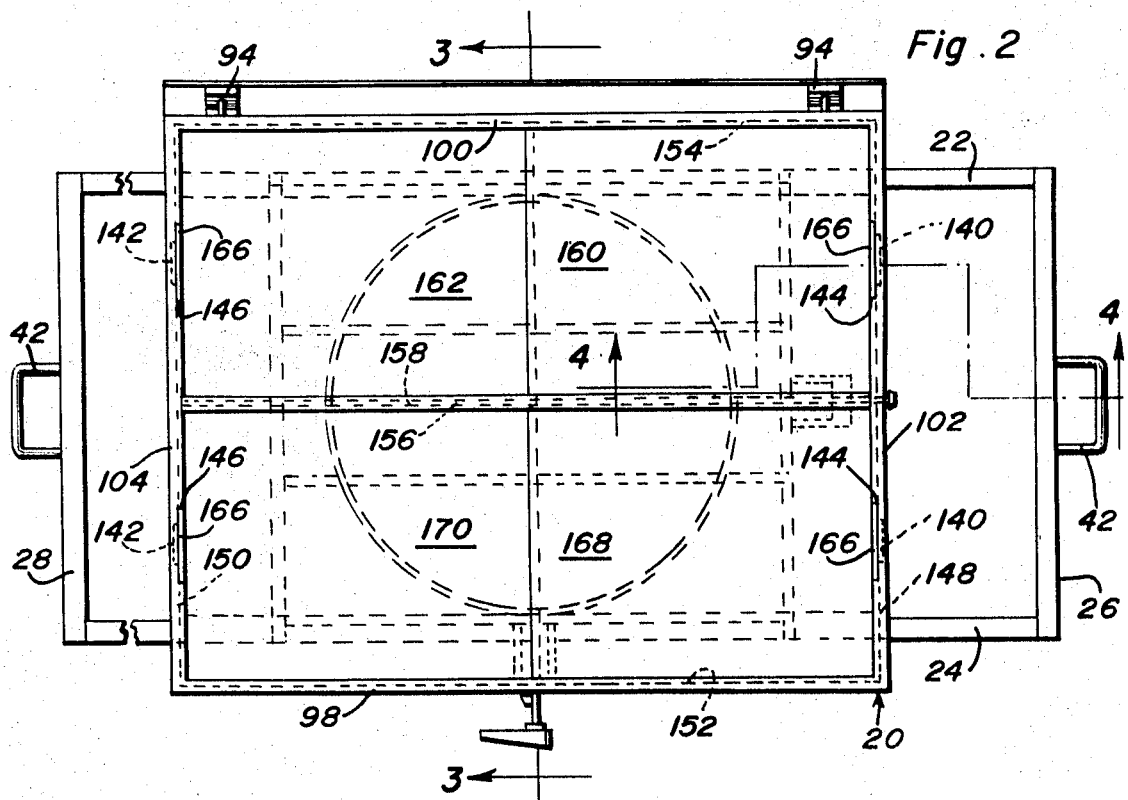
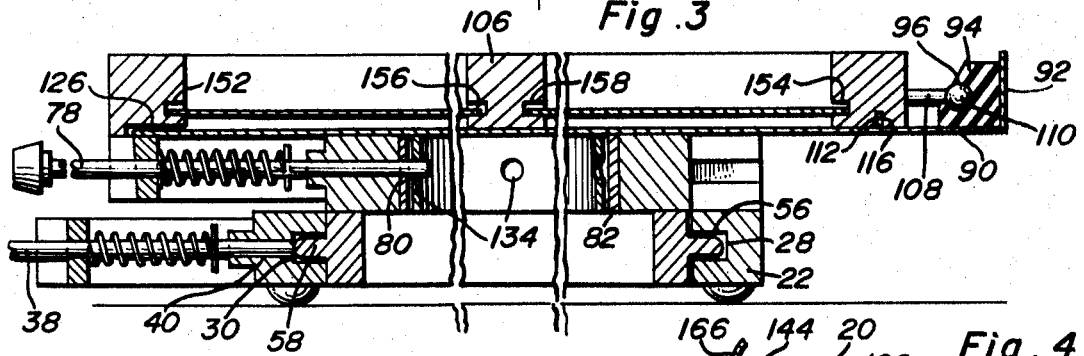
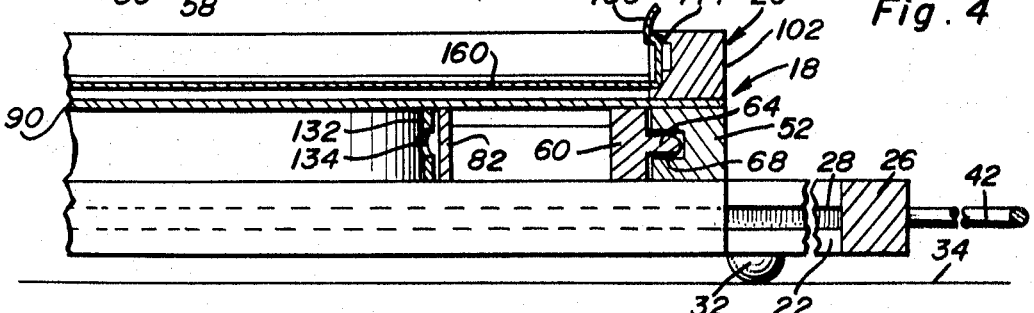
INVENTORS
Artice M. Freund
Laura A. Raad
Wendell J. Johnson
BY John A. Mackinney
ATTORNEY

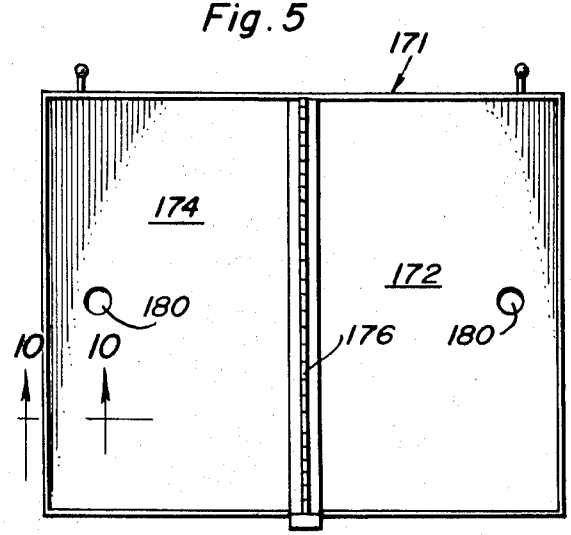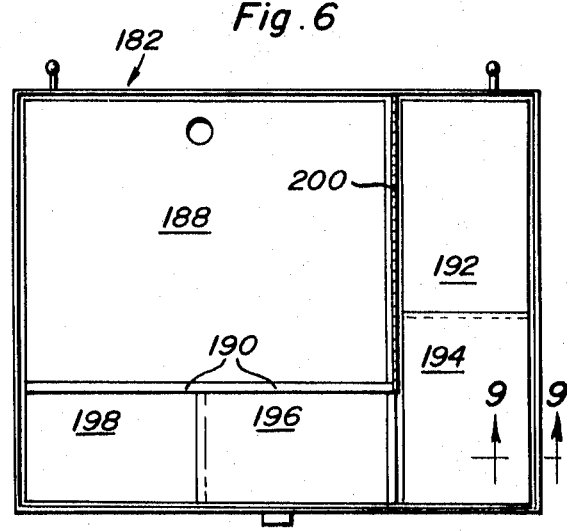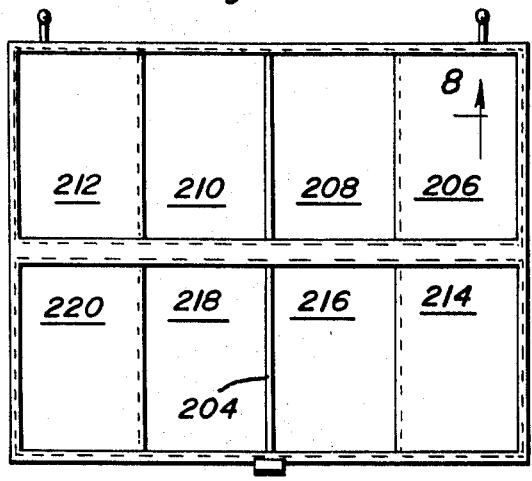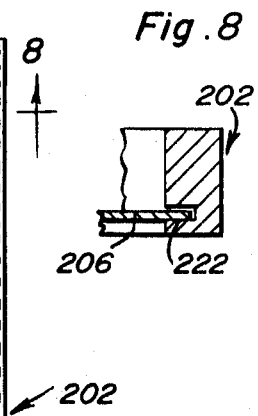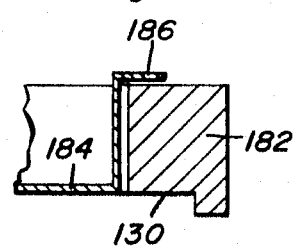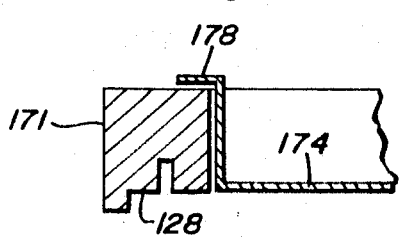
Artice M. Freund
Laura A. Raad
Wendell J. Johnson
INVENTORS

ROTATING PHOTOGRAPHIC ENLARGING EASEL FOR MAKING MULTIPLE OR SINGLE EXPOSURES

Large size photographic print paper measuring 16"×20" may be economically purchased and many different sizes of photographic prints may be made from a single sheet of 16"×20" paper. However, many photographic enlarging easels for supporting such large sheets of photographic paper do not include means by which the entire sheet of print paper may be exposed to form a plurality of the same size or different size prints without excessive handling of the paper and manipulating the various masking portions of the easel with the result that a person using the easel can easily forget the original orientation of the print paper, and which portions thereof have been previously exposed, and thus double expose one or more areas of the paper. In addition, the photographic easels presently in use require such extensive manipulation of the various masking portions of the easel and the printing paper as to greatly increase the time required to from a plurality of prints from a single sheet of photographic print paper.

Accordingly, it is the main object of this invention to provide a photographic easel constructed in a manner whereby an entire 16"×20" sheet of photographic paper or various dimensioned and specifically located areas of the paper may be successively unmasked and correctly oriented relative to the exposure area or zone of an associated enlarger with no need to remove the paper from the easel and to thereafter reinsert the paper in the easel in end to end reversed position and without requiring complicated shifting of masking portions of the easel in order to sequentially properly expose a plurality of the same or different dimensioned areas of the associated print paper.

Another object of this invention is to provide an easel in accordance with the preceding object and including a rotatable photographic print paper support table which is also horizontally shiftable in right angularly disposed paths with means being provided for accurately determining and releasably retaining the print paper supporting table in selected adjusted positions.

Still another object of this invention is to provide a photographic easel in accordance with the preceding objects including controls thereof which may be readily and accurately manipulated in the dark thereby making it unneccessary for the operator to interrupt printing operations in order to illuminate the working area.

A final object of this invention to be specifically enumerated herein is to provide a photographic easel in accordance with the preceding objects which will conform to conventional forms of manufacture, be of simple construction and be easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 2 is an enlarged top plan view of the assembled easel;

FIG. 3 is an enlarged fragmentary vertical sectional view taken substantially upon the plane indicated by the section line 3-3 of FIG. 2;

FIG. 4 is an enlarged fragmentary vertical sectional view taken substantially upon the plane indicated by the section line 4-4 of FIG. 2;

FIG. 5 is a top plan view of a first modified form of cover frame;

FIG. 6 is a top plan view of a second modified form of cover frame;

FIG. 7 is a top plan view of a third modified form of a cover frame;

FIG. 8 is an enlarged fragmentary vertical sectional view taken substantially upon the plane indicated by the section line 8-8 of FIG. 7;

FIG. 9 is an enlarged fragmentary vertical sectional view taken substantially upon the plane indicated by the section line 9-9 of FIG. 6; and FIG. 10 is an enlarged fragmentary vertical sectional view taken substantially upon the plane indicated by the section line 10-10 of FIG. 5.

Figure 1:
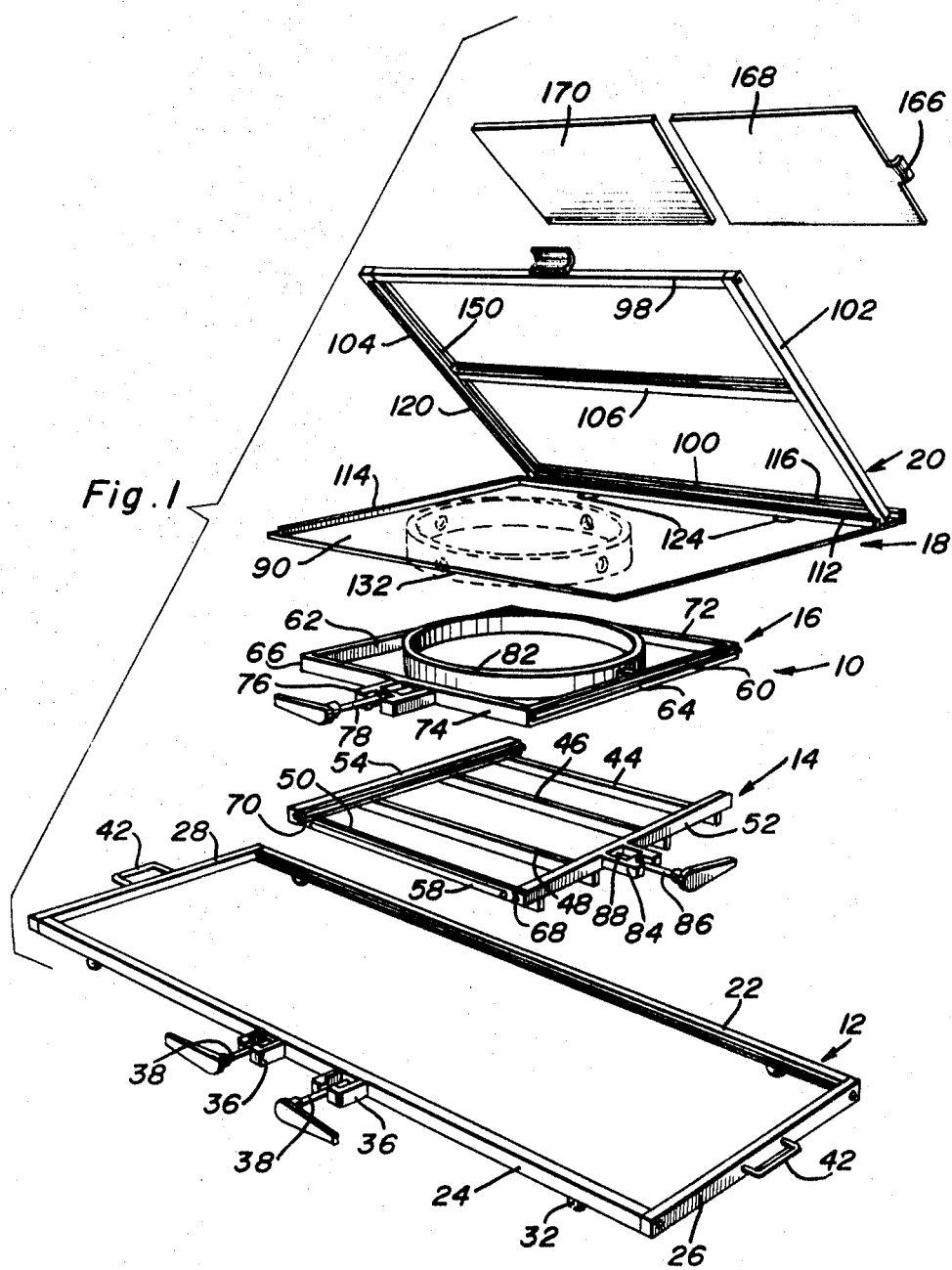
FIG. 1 is an exploded perspective view of the photographic enlarging easel.

Referring now more specifically to the drawings, the numeral 10 generally designates the photographic enlarging easel of the instant invention. The easel 10 includes a base referred to in general by the reference numeral 12, a first frame generally referred to by the reference numeral 14, a second frame generally referred to by the reference numeral 16 and a table or easel head referred to in general by the reference numeral 18. The table or easel head 18 has a holddown or cover frame generally referred to by the reference numeral 20 pivotally supported therefrom to be hereinafter described in detail.

The base 12 comprises a rectangular frame including elongated opposite side members 22 and 24 interconnected at opposite ends by means of transversely extending end members 26 and 28. The side members 22 and 24 are parallel and include longitudinally extending opposing grooves 28 and 30. The grooves 28 and 30 are formed in the inner marginal edge portions of the side members 22 and 24 intermediate the upper and lower surfaces thereof and the opposite end portions of the side members 22 and 24 include depending resilient feet 32 for supporting the frame 12 in the desired location from the surface 34.

The side member 24 includes a pair of identical horizontally disposed U-shaped mounting brackets 36 from which transversely extending and spring urged locating pins 38 are reciprocally supported with their inner ends received through transverse bores 40 formed in the side member 24 and opening into the groove 30 for displacement of the inner ends of the pins 38 slightly inwardly of the grooves 30 for a purpose to become hereinafter apparent. Also, the end members 26 of the frame 12 are provided with horizontally disposed U-shaped handles 42.

The first frame 14 includes a plurality of edge upstanding and horizontally elongated slats 44, 46, 48 and 50 interconnected at corresponding ends by means of end members 52 and 54. The slats 44 and 50 generally parallel each other and include tongues 56 and 58 slidingly received in the grooves 28 and 30. The tongue 58 is frictionally engaged by the inner ends of the pins 38 to frictionally retain the first frame 14 in adjusted and longitudinally shifted position within the frame 12. In addition, the pair of pins 38 serve to take up any clearance between the side members 22 and 24 and the slats 44 and 50 and to prevent the first frame 14 from cocking slightly in the frame 12. If it is desired, precisely spaced notches may be cut in the tongue 58 for bottoming of the pins 38 therein and establishing readily discernable preselected indexed positions of the first frame 14 relative to the frame 12.

The second frame 16 includes a pair of opposite side longitudinal members 60 and 62 including tongues 64 and 66 corresponding to tongues 56 and 58 and slidingly received in corresponding grooves 68 and 70 formed in the end members 52 and 54. The corresponding ends of the side members 60 and 62 are interconnected by means of end members 72 and 74 and the end member 74 includes a U-shaped mounting bracket 76 similar to mounting brackets 36 from which a spring urged locating pin 78 corresponding to the pin 38 is reciprocally supported for extension and retraction of its inner end through an aperture 80 formed in a guide ring 82 supported within the second frame 16 from the side members 60 and 62 and the end members 72 and 74.

The first frame 14 includes a horizontally disposed generally U-shaped mounting bracket 84 which is also similar to the mounting brackets 36 and from which a spring-urged locating pin 86 is reciprocally supported for extension and retraction of its inner end through a bore 88 formed in the end member 52 and frictional engagement with the tongue 64 of the side member 60 of the second frame 16. Accordingly, it may be seen that the locating pin 86 may be utilized to frictionally retain the second frame 16 in longitudinally shifted position relative to the first frame 14. Of course, the tongue 64 of the side member 60 could also be provided with precisely spaced notches in which the inner end of the locating pin 86 could be seated for releasably retaining the second frame 16 in predetermined shifted positions relative to the first frame 14.

The table or easel head 18 includes a rigid base panel 90 including an upturned flange 92 along its rear marginal edge portion. A pair of blocks 94 constructed of resilient material such as rubber are secured to the base panel 90 and the flange 92 at points spaced longitudinally along the latter and define sockets 96.

The holddown or cover frame 20 which comprises the operating head of the easel 10 includes front and rear longitudinal members 98 and 100 interconnected at corresponding ends by means of opposite end members 102 and 104, and a central member 106 is disposed intermediate the front and rear members 98 and 100 and also extends between the end members 102 and 104. The rear member 100 includes a pair or rearwardly projecting arms 108 on whose rear ends a pair of ball members 110 receivable in the sockets 96 are disposed and it may therefore be seen that the holddown or cover frame 20 is pivotally supported from the blocks 94 for swinging movement relative to the base plate 90.

The rear edge portion of the base plate 90 includes a vertically short upstanding flange 112 and the left-hand end of the base panel 90 also includes a vertically short upstanding flange 114. The rear member 100 and the end member 104 include downwardly opening grooves 116 and 120, respectively, in which the flanges 112 and 114 are receivable. In addition, the base panel 90 includes a pair of paper catches or clips 124 of any suitable design which project forwardly of the flange 116 and are adapted to hold down photographic print paper on the panel 90.

The undersurface of the front member 98 extends forward of the forward edge of the base panel 90 and is relieved as at 126 whereby the front member 98 will lap over the forward edge of the base panel 90. In addition, the end members 102 and 104 extend over the end edges of the base panel 90 and are similarly relieved as at 128 and 130, see FIGS. 9 and 10.

The base panel 90 further includes a guide ring 132 which is dependingly supported therefrom and snugly receivable in the guide ring 82. The guide ring 132 is provided with a plurality of positioning apertures 134 spaced at 90° intervals thereabout and the inner end of the locating pin 78 may be displaced inwardly through the aperture 80 into any selected aperture 134 to retain the base panel 90 in adjusted rotated position relative to the second frame 16.

The end members 102 and 104 have recessed magnets 140 and 142 supported therefrom and are also relieved as at 144 and 146 for a purpose to become hereinafter apparent. Further, the end members 102 and 104 include inwardly opening grooves 148 and 150 which oppose each other and interconnect the opposite ends of corresponding inwardly opening grooves 152 and 154 formed in the front and rear members 98 and 100. Further, the central or intermediate member 106 includes oppositely opening grooves 156 and 158 which oppose the grooves 152 and 154, respectively.

A pair of stainless steel covers 160 and 162 are slidingly disposed in the grooves 154 and 158 and their opposite ends are receivable in the grooves 148 and 150. The ends of the covers 160 and 162 adjacent the end members 102 and 104 include upstanding tongues 166 receivable in the relieved areas 144 and 146 and which project above the frame 20 to form handles for the covers 160 and 162. In addition, a second pair of covers 168 and 170 are slidingly disposed in the grooves 152 and 156 and include similar tongues 166.

With attention now invited more specifically to FIG. 5 of the drawings there will be seen a modified form of frame generally referred to by the reference numeral 171 which is substantially indentical to the frame 120 but which has a pair of stainless steel covers or panels 172 and 174 hingedly secured together as at 176 and including flanged portions 178, see FIG. 10, which overlie the end members of the frame 171. The covers 172 and 174 are provided with knobs 180 whereby they may, of course, be pivoted toward open positions to expose the underlying portion of a sheet of photographic print paper.

With attention now invited more specifically to FIG. 6 of the drawings there will be seen a second modified form of cover frame generally referred to by the reference numeral 182 and which is also similar to the frame 20. The frame 182 may include a one-piece insert panel 184 in the L-shaped portion thereof including frame overlying flange portions 186 and a swingable panel such as panel 188 which is hinged to the insert 184 in the areas 190. However, the L-shaped area of the frame 182 may also include slidable cover sections 192, 194, 196 and 198 mounted in appropriate grooves similar to grooves 148 and 152 and the hinged panel 188 may be hingedly supported as at 200.

With reference now to FIG. 7 of the drawings there may be seen a third form of frame referred to in general by the reference numeral 202 and which is similar in many respects to the frame 20 but which includes an additional dividing wall 204 and eight slidable panels 206, 208, 210, 212, 214, 216, 218 and 220 which are supported from grooves 222 similar to grooves 148, 150, 152 and 154 and which may be slid into overlapping engagement with the adjacent panel so as to uncover a specified 5"×7" area of the photographic print paper covered by the frame 202.

The panel 188 may be opened to expose an 11"×14" area of the photographic print paper disposed beneath the frame 182 and the panels 192, 194, 196 and 198 may be slid toward overlapped positions with the adjacent panels to expose four 5"×" areas of the photographic print paper disposed beneath the frame 182. Of course, the panels 172 and 174 may each be swung to the open position in order to expose a 10"×" area of the associated photographic print paper or removed for exposing the full 16"×20" area of the paper.

From the foregoing it may be appreciated that the first and second frames 14 and 16 may be shifted relative to the frames 12 and 14, respectively, and that the table or operating head 18 may be rotated as desired in order to properly position the desired area of the associated photographic print paper for exposure. Of course, the panels 160, 162, 168 and 170 may be readily shifted toward open positions as desired depending upon the indexing of the frames 14 and 16 as well as the table or operating head 18 and the magnets 140 serve to magnetically attract the tongues 166 and retain the panels 160, 162, 168 and 170 in the closed positions.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

We claim:

1. A rotating photographic enlarging easel comprising a base, first and second members guidingly shiftably supported from said base and first member, respectively, for movement along right angle paths disposed in the same plane, a third member rotatably supported from said second member for angular displacement relative thereto about an axis normal to said plane and defining a support surface paralleling said plane, a generally rectangular holddown frame positionable over said surface and a piece of photographic paper disposed on said surface and including a plurality of cover panel sections supported therefrom disposed in position closely overlying said surface so as to cover and mask out portions of said paper from light beams cast downwardly from above said frame, at least one of said cover panel sections being supported from said frame for shifting to an out-of-the-way position, whereby the paper underlying the area previously masked by said one section may be exposed by said light beams, said cover panel sections equal five in number and four of said sections are supported from said frame for horizontal shifting relative thereto while the fifth section is hingedly supported for swinging movement relative to said frame.

2. A rotating photographic enlarging easel comprising a base, first and second members guidingly shiftably supported from said base and first member, respectively, for movement along right angle paths disposed in the same plane, a third member rotatably supported from said second member for angular displacement relative thereto about an axis normal to said plane and defining a support surface paralleling said plane, a generally rectangular holddown frame positionable over said surface and a piece of photographic paper disposed on said surface and including a plurality of cover panel sections supported therefrom disposed in position closely overlying said surface so as to cover and mask out portions of said paper from light beams cast downwardly from above said frame, at least one of said cover panel sections being supported from said frame for shifting to an out-of-the-way position, whereby the paper underlying the area previously masked by said one section may be exposed by said light beams, said second and third members including snugly telescopingly engaged cylindrical members rotatable relative to each other defining said axis of rotation, the outer cylindrical member including means releasably engageable with the inner cylindrical member for retaining the outer member in adjusted position relative to the inner member.